Sept. 22, 1964  S. M. DOCKERTY ETAL  3,149,949
DOWNFLOW SHEET DRAWING METHOD AND APPARATUS
Filed Feb. 27, 1961
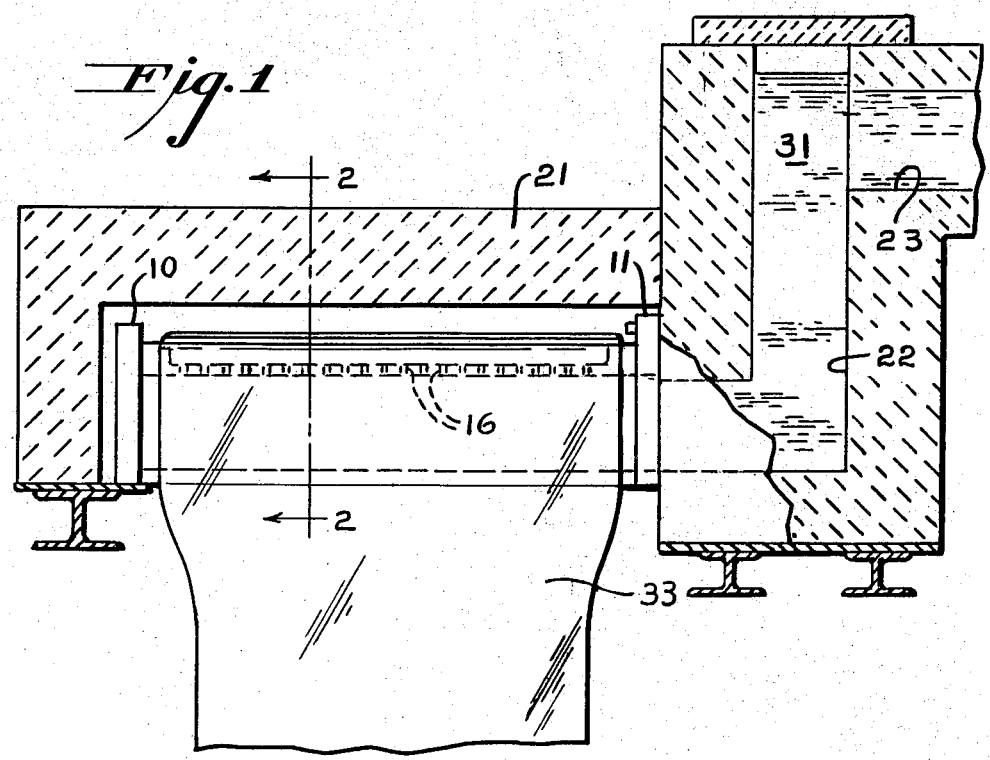
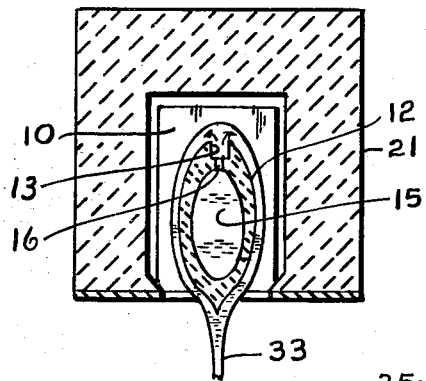
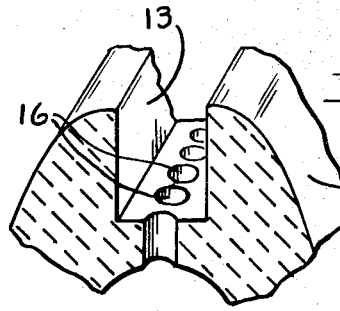
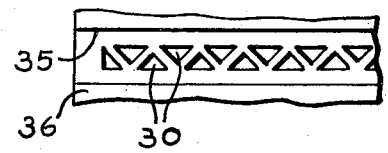
INVENTORS
STUART M. DOCKERTY
AND GEORGE C. SHAY
BY Clarence R. Patty, Jr.
ATTORNEY

3,149,949
DOWNFLOW SHEET DRAWING METHOD AND APPARATUS

Stuart M. Dockerty and George C. Shay, Corning, N.Y., assignors to Corning Glass Works, Corning, N.Y., a corporation of New York
Filed Feb. 27, 1961, Ser. No. 91,742
4 Claims. (Cl. 65—53)

The present invention relates to the production of sheets of thermoplastic material involving the flow of streams of such molten material down the converging sides of a sheet forming member and that join to form a single sheet as they leave such member.

Many systems have heretofore been suggested, for example to produce sheet glass, involving the introduction of molten glass into a trough of a member having two oppositely downwardly converging side walls, feeding molten glass to the trough while molten glass overflows or spills from the trough side walls and flows in thin sheet-like streams down such walls. These streams merge one another adjacent the lines of juncture of such side walls and form a single sheet drawn downwardly from the weight of the pendant glass, assisted by any suitable form of drawing mechanism.

In all of such systems known to applicants the molten glass is directly supplied to the trough in one or more streams introduced into the trough either from above it or through its ends. In such arrangements uniformity in the height and width of the walls where the glass overflows is very critical and such a trough can only deliver streams of glass of uniform thickness providing glass enters the trough in such a manner that it is available in like volume along its entire length.

When glass is introduced into the trough ends a greater overflow is likely to occur from glass surging upwards near its ends than in the central space therebetween, thus contributing to the obtainance of a sheet which is thinner in the central regions than in the lateral regions. Moreover when the slot bordering walls of the trough comprises also the metering passage for glass introduced thereinto, as when glass is fed to the trough ends, the rate of glass flow thereover for any given head of glass will vary as a result of any significant dimensional change in slot width; and since under these circumstances the slot bordering walls are subjected to pressures in direct relation to the height of the glass head, they are particularly vulnerable to dimensional change. If on the other hand a stream or ribbon of glass is fed to the trough from above it, the stream overflowing the trough will vary in thickness as the thickness of the fed stream transversely varies. Also when such a stream enters the top of the pool of glass within the trough there is the danger of the stream interfering with the desirably undisturbed flow of glass from the top of the pool over the trough side walls.

According to the present invention the glass feeding member also has embodied in its top surface a trough over the two opposite converging side walls of which glass flows. Such trough, however, is supplied with molten glass from a tubular reservoir thereunder, conveniently embodied in such member, via a row of metering passages extending between the reservoir and the trough bottom along its entire length. Supply of molten glass to the reservoir, and thence to the trough via such passages, is from a head of glass having access to the reservoir at one end thereof. Such glass is supplied under a sufficient head to insure that a desired volume of glass issues from each of the respective passages to keep the trough supplied with a desired volume of glass in the respective regions along its length and without disturbing the streams of glass overflowing the trough. With this construction, substantially all of the resistance to flow is borne by the network of wall structure bordering the metering passages, thus avoiding the building up of pressures between the trough side walls that would tend to warp them in directions to widen the gap therebetween. Thus, by feeding the trough via a row of metering passages, the primary cause of warping of the trough walls is avoided and such warping as does occur does not materially change the volume of glass flow therefrom.

As will be understood the cross sectional shape and arrangement of the metering passages are a matter of choice. For example, the passages may simply comprise circular apertures. Alternatively the apertures may be non-circular and so arranged that streams issuing therefrom have a greater portion of their borders in close proximity with one another as they enter the trough, than possible when circular apertures are provided, to further insure full blending of the streams within the trough.

Also, as will be well understood, the cross sectional dimensions of the metering passages or apertures is a matter of choice and depends upon the character of sheet desired. For example, if a flat sheet is to be produced that is transversely uniform in thickness, the dimensions of the passages in the end regions of the trough may differ in a graduated manner from those in the mid region thereof to meter the flow in a manner to compensate for the greater heat loss in the lateral regions of the sheet than in the mid region thereof.

On the other hand, or additionally, if it is desired to produce a sheet varying in thickness, or having a wavy pattern for example, each alternate passage may sufficiently differ in size from the adjacent passage that with a sufficient head of glass transversely undulating streams of glass would flow over the trough side walls to impart the desired varied characteristics to the sheet produced.

For a better understanding of the invention reference is now made to the accompanying drawing wherein:

FIG. 1 is a side elevational view, partly in section, of a sheet forming apparatus embodying the invention.

FIG. 2 is a view taken on lines 2—2 of FIG. 1.

FIG. 3 is an enlarged perspective view of a fragment of the form of feeder member shown in FIGS. 1 and 2.

FIG. 4 is a top plan view of a fragment of an alternative form of feeder member embodying the invention.

Referring to the drawing in detail, a feeding member is provided having end walls 10 and 11 and two oppositely disposed converging side walls such as 12 having embodied in its top a trough 13 over the two opposite side walls of which glass can be caused to flow from the trough. The feeding member has embodied within it a tubular reservoir 15 in communication with the trough 13 via circular apertures or passages such as 16 arranged in a row in the region of the top wall of the feeding member comprising the bottom wall of the trough 13.

The feeding member is suitably supported within a muffle 21 and at the end 11 the reservoir 15 is arranged in communication with a chamber 22 into which molten glass, from a suitable melting tank, is supplied through a channel 23.

Under some circumstances, as when the glass is below a given viscosity, the provision of a row of circular apertures may prevent full homogeneity of the glass of adjacent streams within the trough. Under these circumstances it may be desirable to provide passages between the reservoir and the trough which bring the roots of the adjacent streams issuing from the reservoir in laterally overlapping relation. A row of triangular passages 30 as illustrated in FIG. 4 ideally serves to bring the streams in overlapping relation with one another at their roots to obtain better homogeneity of the glass wholly within the trough 35 of a feeding member 36.

As will be understood the possible alternatives to the two aperture arrangements shown are practically unlimited.

In operation, molten glass 31 enters chamber 22 from channel 23 and fills up the reservoir 15. Because of the head of glass provided, the glass wells up into trough 13 and then flows down the side walls, such as 12, to be united at the lower edge thereof into a single sheet 33.

It will be understood that the forms of the invention herewith shown and described are to be taken as the preferred embodiments of the same, and that various changes in the shape, size and arrangement of parts may be resorted to without departing from the spirit of the invention or the scope of the appended claims.

What is claimed is:

1. An improved method of producing sheet glass which comprises, forming a longitudinally-extending reservoir body of molten glass, continuously introducing molten glass into such reservoir body below the surface thereof, simultaneously issuing a plurality of separate and distinct longitudinally spaced-apart streams of molten glass upwardly from the reservoir body along its longitudinal extent into a common forming pool above such reservoir body, flowing the molten glass downwardly from the upper surface of such forming pool along two oppositely disposed downwardly converging paths, and joining the molten glass flowing along such paths to form a single sheet of glass.

2. An improved method of producing sheet glass as defined in claim 1 which includes the step of upwardly flowing separate and distinct streams of molten glass into the forming pool at a plurality of points spaced-apart along its longitudinal extent and centrally of its transverse extent.

3. Apparatus for producing sheet glass which comprises, a hollow body member having an upper wall portion communicating with a pair of downwardly converging side wall portions, a supply reservoir formed within said hollow body member, an upwardly open recessed portion formed in said upper wall portion, a plurality of passages extending through said upper wall portion and communicating between said supply reservoir and said recessed portion, and means communicating with one end of said supply reservoir for introducing molten glass therewithin.

4. Apparatus for producing sheet glass which comprises, a closed hollow tubular member, a reservoir chamber formed within said hollow tubular member and bounded along its longitudinal extent by an upper wall and a pair of downwardly converging side walls, an open end wall communicating with said reservoir chamber for supplying molten glass thereto, an upwardly open trough formed in said upper wall and communicating at its upper end with said downwardly converging side walls, and a plurality of spaced-apart passages formed in said upper wall below said trough and communicating between said reservoir chamber and said trough.

References Cited in the file of this patent

UNITED STATES PATENTS

| 1,631,805 | Ferngren | June 7, 1927 |
| 1,753,768 | Blair | Apr. 8, 1930 |
| 1,772,448 | Allen | Aug. 12, 1930 |
| 1,829,641 | Ferngren | Oct. 27, 1931 |
| 1,836,394 | Reece | Dec. 15, 1931 |
| 1,841,579 | Fraser | Jan. 19, 1932 |
| 1,872,550 | Allen | Aug. 16, 1932 |
| 1,891,373 | Danner | Dec. 20, 1932 |